No. 867,338. PATENTED OCT. 1, 1907.
T. J. BARNES.
BARBED WIRE FENCE.
APPLICATION FILED DEC. 7, 1906.
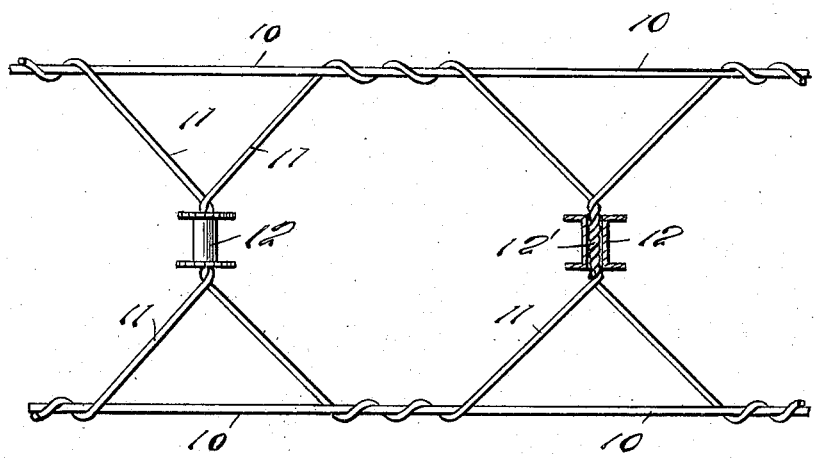
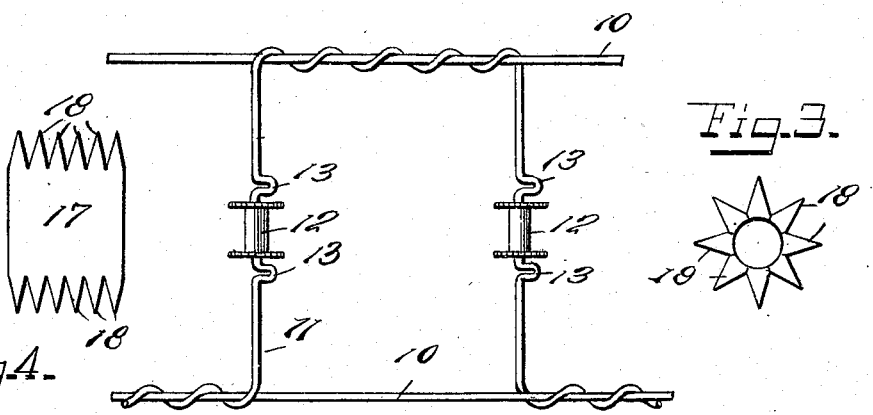
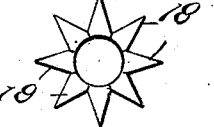
Inventor
T. J. Barnes
Witnesses
By
Attorneys

UNITED STATES PATENT OFFICE.

THOMAS J. BARNES, OF JULESBURG, COLORADO.

BARBED-WIRE FENCE.

No. 867,338.     Specification of Letters Patent.     Patented Oct. 1, 1907.

Application filed December 7, 1906. Serial No. 346,738.

*To all whom it may concern:*

Be it known that I, THOMAS J. BARNES, a citizen of the United States, residing at Julesburg, in the county of Sedgwick, State of Colorado, have invented certain new and useful Improvements in Barbed-Wire Fences; and I do hereby declare the following to be a full, clear, and exact description of the invention, such as will enable others skilled in the art to which it appertains to make and use the same.

This invention has relation to barbed-wire and other barbed fences; it having for its object the provision of a construction in which each of the parts provided with the barbs may rotate on its support, so that an animal coming in contact with the fence or moving along the same in contact therewith will be pricked by the barbs, and not be scratched or have its flesh torn, as is the case where the barbs are sustained in fixed position or form an integral part of a fixed or stationary wire.

The nature of the invention may be fully ascertained from the device portrayed in the annexed drawing, forming a part of this specification in view of which the improvement will first be described with respect to its construction and mode of operation and then be pointed out in the claims.

Of the said drawings—Figure 1 is a side view of so much of a wire-fence equipped with my improvements as it is necessary to show. Fig. 2 is a modified form of means for supporting the rotary barbs on the fence. Fig. 3 is an end view of a barbed spool that may be used in carrying out the invention. Fig. 4 is a sheet metal blank developed from which the form of rotary barbs shown, may be made.

Similar numerals of reference designate similar parts or features, as the case may be, wherever they occur.

In carrying out my invention I employ longitudinal wires 10 which are spaced apart and connected at intervals by lighter wires 11. Two wires 11 are twisted about two wires 10 for a short distance and then are crossed and twisted together between the wires 10 and then taken each to the opposite wire 10 and twisted about it for a short distance after which they are again brought together and twisted, as illustrated at 12'. Upon each twisted portion 12' which is at right angles to the wires 10, is disposed a metallic spool consisting of a small metallic blank 17 having fingers 18 at its ends. The blank 17 is bent to form the body portion 12 of the spool which is cylindrical, and the teeth 18 are bent to radiate at right angles from each end of the body portion 12. The twisted portions 12 of the wires 11 are somewhat longer than the spools so that the latter may rotate freely thereon and thus if an animal comes in contact with the teeth 18, they will merely prick the skin of the animal instead of tearing it.

Instead of using two wires 11, a single such wire may be employed as shown in Fig. 2 and may be twisted first around one wire 10 and then taken at right angles to the other wire 10 and twisted around it for a short distance and then brought back to the first wire and twisted around it and then returned to the second wire and so on. Each portion of the wire 11 between the wires 10 is provided with spaced kinks 13 and a spool 12 is mounted to rotate upon the wire 11 between each pair of kinks.

What is claimed is:—

A barbing device for wire-fences consisting of a metal blank having terminal teeth or spurs, the blank between the teeth being bent into cylindrical form and the teeth being bent outward radially to the cylinder.

In testimony whereof, I affix my signature, in presence of two witnesses.

THOMAS J. BARNES.

Witnesses:
ETTA M. MILES,
FRANK GESNE.